United States Patent [19]
Jones et al.

[11] Patent Number: 5,248,177
[45] Date of Patent: Sep. 28, 1993

[54] FABRIC PICKUP DEVICE

[75] Inventors: William S. Jones, Staley; Roger W. Zimmerman, Liberty, both of N.C.

[73] Assignee: Wrangler, Greensboro, N.C.

[21] Appl. No.: 828,182

[22] Filed: Jan. 30, 1992

[51] Int. Cl.⁵ .......................... B25J 15/08; B65H 3/02
[52] U.S. Cl. .......................... 294/88; 271/19; 294/116
[58] Field of Search .................. 294/8.6, 50.5, 61, 88, 294/107, 115, 116, 902; 271/18, 18.3, 19, 204, 206, 268, 900

[56] References Cited

U.S. PATENT DOCUMENTS

| | | | |
|---|---|---|---|
| 1,457,198 | 5/1923 | Utley | 294/115 |
| 1,539,088 | 5/1925 | Jones | 294/50.5 |
| 3,176,979 | 4/1965 | Engelmann | 271/18.3 |
| 3,253,824 | 5/1966 | Southwell et al. | 271/19 |
| 3,588,091 | 6/1971 | Stone et al. | 271/19 |
| 3,659,331 | 5/1972 | Drake et al. | 294/8.6 X |
| 3,813,094 | 5/1974 | Walton et al. | 271/19 |
| 3,902,750 | 9/1975 | Roitel | 271/18.3 X |
| 4,103,884 | 8/1978 | Kawashima | 294/61 X |
| 4,444,384 | 4/1984 | Keeton | 271/18.3 |
| 4,505,468 | 3/1985 | Heisler | 271/18.3 |
| 4,526,363 | 7/1985 | Fort | 271/268 |
| 4,579,331 | 4/1986 | Nestler et al. | 294/61 X |
| 4,645,193 | 2/1987 | Walton et al. | 294/61 X |
| 4,697,837 | 10/1987 | Fort | 294/88 |
| 4,924,738 | 5/1990 | Che | 294/115 X |
| 5,018,715 | 5/1991 | Reeves et al. | 271/19 |

FOREIGN PATENT DOCUMENTS

| | | | |
|---|---|---|---|
| 2542 | 1/1980 | Japan | 271/19 |
| 207231 | 12/1983 | Japan | 271/18.3 |
| 221021 | 10/1986 | Japan | 271/18.3 |

OTHER PUBLICATIONS

Brochure entitled "Textile Pick-up", undated, from Tex-Matic of Denmark.

*Primary Examiner*—Johnny D. Cherry
*Attorney, Agent, or Firm*—Rhodes, Coats & Bennett

[57] ABSTRACT

A pickup device for use with a fabric piece handling system for picking up and placing fabric pieces. The device includes a frame and a pair of opposed jaws moveably attached at one end to the frame. The head portion of each opposed jaw includes a fabric contact surface having an array of fabric engaging teeth for urging a portion of the fabric piece into a bunched condition for pickup and a gripping surface adjacent to the fabric contact surface for engagement with the other opposed jaw for picking up the fabric piece. A fluid operated piston is attached between the frame and the pair of opposed jaws for moving the pair of opposed jaws between a first position wherein the pair of opposed jaws are in an unobstructed open position to allow a piece of cloth to freely pass into a position between the pair of opposed jaws and a second position wherein the pair of opposed jaws are in an operative clamping position with respect to each other to clamp a piece of cloth therebetween. An ejector adjacent to the jaws disengages the piece of cloth therebetween the pair of jaws when the pair of opposed jaws are in the unobstructed open position.

22 Claims, 4 Drawing Sheets

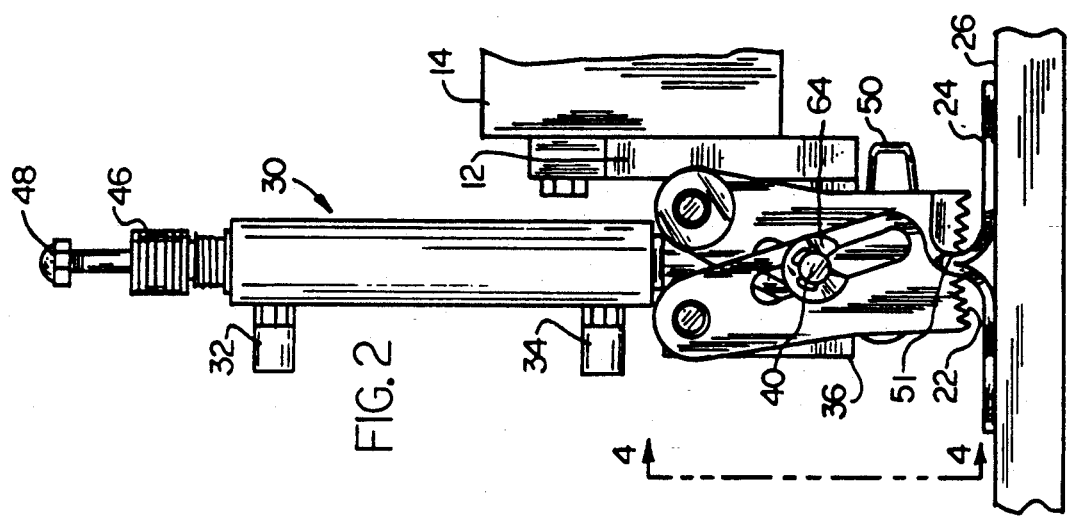
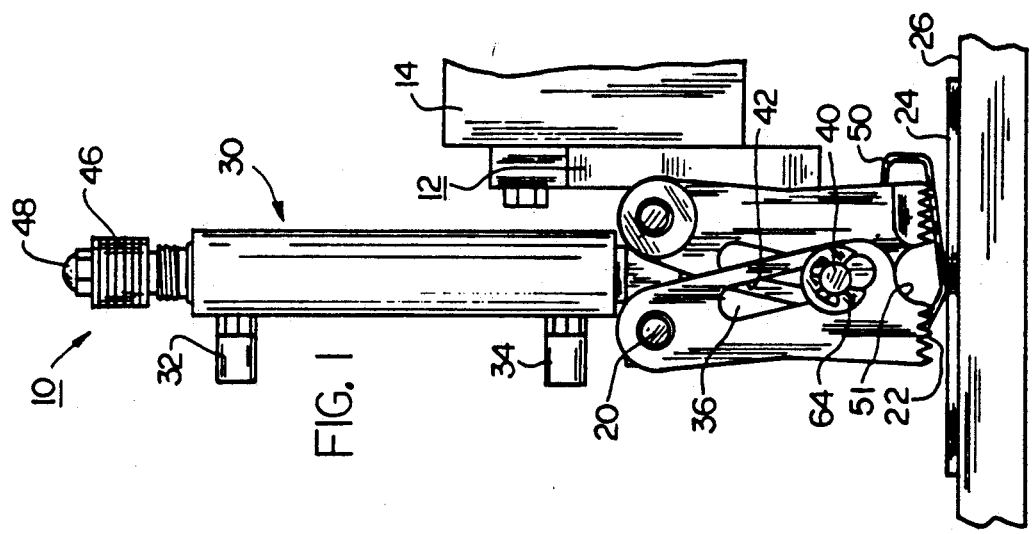

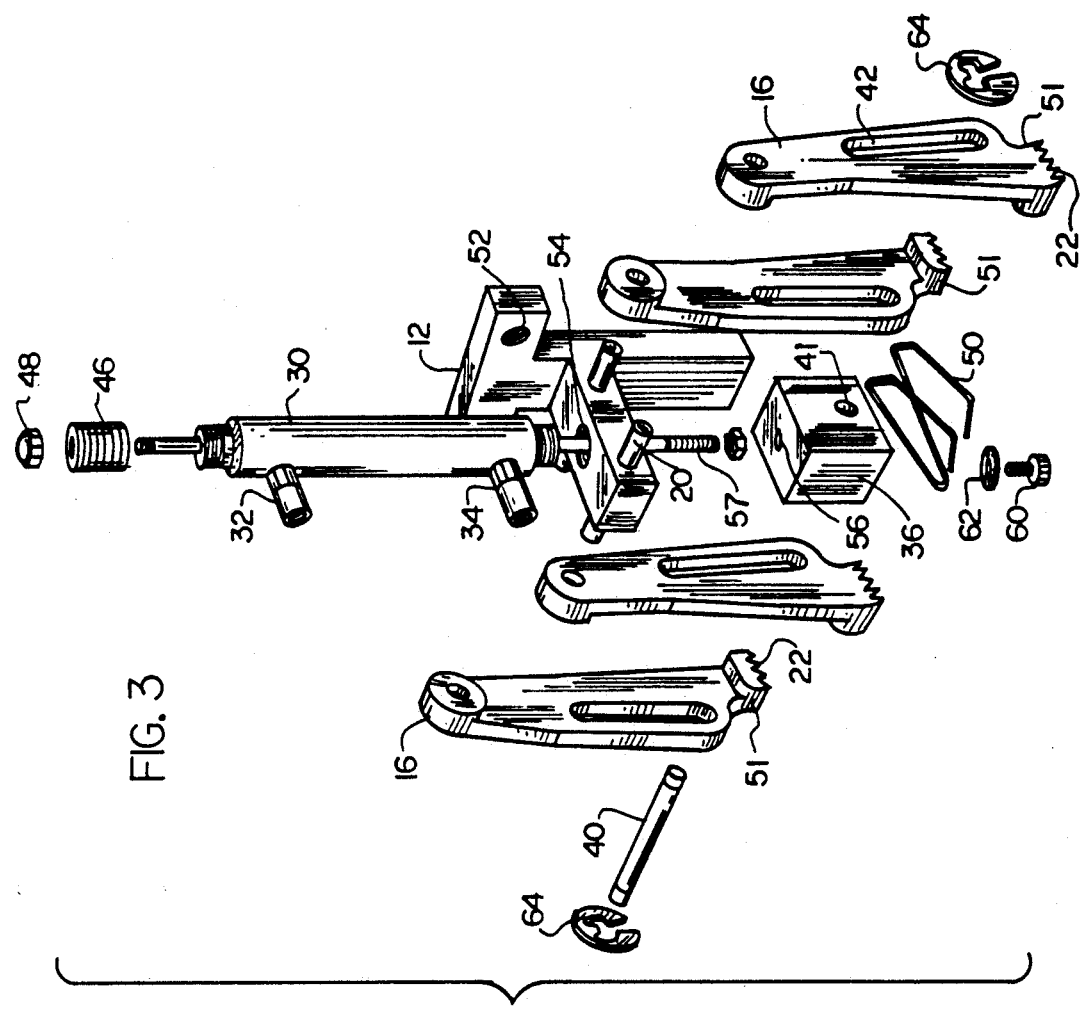

FABRIC PICKUP DEVICE

BACKGROUND OF THE INVENTION (1) Field of the Invention

The present invention relates generally to systems for handling fabric pieces for apparel manufacture and, in particular, to a new and novel pickup device for such a system.

(2) Description of the Prior Art

The move towards automation in the apparel industry has been hindered by the lack of commercially viable means for removing pieces of fabric, one at a time, from a supported stack of fabric pieces. In order for a pickup device to be practical, it must have a high degree of reliability in separating a single piece of fabric from the top of a stack without picking up two or more pieces and, in addition, it must be economical to manufacture and operate. For example, it has been estimated that one malfunction in one thousand operation cycles is the degree of reliability necessary for a profitable manufacturing operation.

U.S. Pat. No. 4,444,384, issued to Keeton, discloses a cloth pickup device including first and second jaws pivotally mounted for movement from a clamping position to an open position. When the jaws are moved into contact with a piece of cloth, they are pivoted to clamp the cloth between them with needles extending from the first jaw piercing the cloth. An overcenter spring holds the jaws in both their first and second positions. When it is desired to release the cloth held by the jaws, a plunger is depressed, engaging the jaws and pivoting them to their open position.

U.S. Pat. No. 4,526,363, issued to Fort, discloses a gripper for textile machines which includes a gripping clamp and an apparatus for opening and closing the clamp. The clamp includes a fixed central member provided laterally and on either side with a resilient portion, two arms crossing each other for constituting a pair of gripping jaws, each arm being provided with a key preferably in the outer extension of the resilient portion. The opening and closing apparatus includes a pair of vertically movable fingers, by reason of one per arm, which are adapted in their lower position to depress the keys in order to cause the distortion of the resilient portions and thus modify the degree of crossing of the jaw forming portions. The height of the vertically movable fingers appears to be adjustable to control the degree of opening of the jaws.

A somewhat similar device is shown in U.S. Pat. No. 4,697,837, also issued to Fort, for a gripper. The gripper includes tongs formed by two oscillating jaws. The jaws are solid in rotation with two shafts rotating in bearings carried by a frame solid with the rod of a jack. The rotation of the shaft is caused by the angular movement of a maneuvering part connecting each shaft to a stationary part.

In addition to the above "pinch-type" devices, various other pickup devices employing one or more gripping clutches have been proposed. U.S. Pat. Nos. 5,018,715 and 3,588,091 are illustrative of such approaches.

U.S. Pat. No. 5,018,715, issued to Reeves et al., discloses a fabric pickup device useful for a fabric handling system. The entire disclosure of this patent is hereby incorporated in the present case by reference and in its entirety. The fabric pickup device includes a fluid operated cylinder and piston having four individual fabric clutches attached to the cylinder and aligned with and substantially equality spaced apart from the axis of the piston. Each clutch has a head portion having a plurality of resilient pickup fingers spaced apart from one another. A substantially flat actuator plate is attached to the free end of the piston and is oriented perpendicular to the axis of the piston. The actuator plate has a series of apertures for receiving the individual pickup fingers. The openings in the actuator plate are sized such that when the plate is retracted by the action of the fluid cylinder, the resilient fingers of each pickup finger separate and, when the plate is extended, the finger are brought together to grip the top surface of a fabric piece. Because the pickup fingers are actuated by the movement and contact with the actuator plate and are themselves fixedly mounted to the actuator plate, the vertical position of the pickup fingers remains constant even during actuation, thereby reducing the degree of control necessary for reliable ply separation of small fabric pieces.

U.S. Pat. No. 3,558,091 issued to Stone et al., discloses an apparatus and method for picking up individual pieces of cloth from a stack, carrying the individual pieces of cloth away from the point of picking them up, and depositing them individually on a support, such as a conveyor. The pickup head, as taught by Stone, has a sleeve having one end secured to the piston of an air cylinder and the lower end formed to provide a plurality of equally spaced fingers having cloth-gripping or pinching bottom terminals. The sleeve is surrounded by a head or housing having a bore for receiving the sleeve which includes a lower adjustable portion which has a bore which engages the finger terminals when the air cylinder is actuated. Consequently, when the air cylinder is displaced downwardly, the surfaces of the gripping fingers contact the surface of the lower housing which results in closing the fingers so as to pinch a layer of cloth preparatory to lifting the cloth from the stack.

The Tex-Matic product brochure shows a fabric pickup having six individual gripping fingers equally spaced apart from one another. The fabric pickup device as disclosed by the Tex-Matic product brochure is air operated by a single cylinder which actuates the plurality of pickup fingers simultaneously.

Certain disadvantages become apparent with such designs. First, many of the prior art devices require that the surface of the cloth be penetrated in part by a wire or needle, for example in the construction of the pickup devices as taught by Keeton and Fort '363, in order to increase the reliability of the cloth pickup. Such penetration can result in the introduction of undesirable surface defects, particularly in tightly woven or shear fabrics.

Second, prior art devices have not provided a means for aiding the release of the fabric piece from the pickup device to prevent "sticking" of the fabric piece in the pickup head.

Third, many prior art pickup devices are designed in such a way that a compound movement in both the vertical as well as the horizontal planes must be made in order to contact and pickup the fabric piece. This requires that the position of the device be carefully controlled in both the x,y directions and the z direction. For example, in the construction of the pickup device as taught by Stone, the pickup fingers themselves actually move downwardly and, consequently, the distance between a fabric piece and the pickup head varies when the device is actuated. As a result, such a device cannot be readily adapted to a more simple and reliable x,y coordinate control system.

Finally, prior art devices to date have been overly complicated and expensive to construct to such a degree that they have not been widely adapted by the apparel manufacturing community. For example, the pickup devices as taught by Stone are each individually actuated by a corresponding individual air cylinder.

It has thus become desirable to develop a fabric pickup device for a fabric handling system that will reliably pickup and release pieces of fabric from a supported stack of fabric one at a time without picking up two or more pieces. It has also become desirable to develop a pickup device which will not mar the surface of the fabric. Finally, it has become desirable to develop a fabric pickup device which is simple and economical to manufacture and operate, thereby facilitating the move towards automation in the apparel industry.

SUMMARY OF THE INVENTION

The present invention is directed to a pickup device for use with a fabric piece handling system for picking up and placing fabric pieces. The device includes a frame and a pair of opposed jaws moveably attached at one end to the frame. In the preferred embodiment, a second pair of opposed jaws are attached to the frame parallel to and spaced apart from the first pair of opposed jaws. The head portion of at least one of the jaws includes a fabric contact surface having an array of fabric engaging teeth for urging a portion of the fabric piece into a bunched condition for pickup and a gripping surface adjacent to the fabric contact surface for engagement with the other opposed jaw for picking up the fabric piece. In the preferred embodiment, the array of fabric engaging teeth are "saw-tooth"-shaped and are arranged into at least two spaced apart rows oriented parallel to the direction of movement of the jaw.

Actuating means are attached between the frame and the pair of opposed jaws. The actuating means are adapted for moving the pair of opposed jaws between a first position wherein the pair of opposed jaws are in an unobstructed open position to allow a piece of cloth to freely pass into a position between the pair of opposed jaws and a second position wherein the pair of opposed jaws are in an operative clamping position with respect to each other to clamp a piece of cloth therebetween. The actuating means includes a fluid operated piston attached to the frame and having one free end of the piston attached to the pair of opposed jaws. The other free end of the piston includes an adjustable stop means for limiting the forward movement of the piston, thereby controlling the size of the opening therebetween the pair of jaws when the pair of opposed jaws are in the unobstructed open position.

An ejector means is attached to the actuating means, wherein the ejector means and actuating means cooperate together to disengage a piece of cloth therebetween the pair of jaws when the pair of opposed jaws are in the unobstructed open position.

Because the pair of opposed jaws are themselves fixedly mounted to the frame, the vertical position of the jaws remains relatively constant, even during actuation. In addition, the simplified design of the fabric pickup device of the present invention permits the economical manufacture and use of the device.

Accordingly, one aspect of the present invention is to provide a pickup device for use with a fabric piece handling system. The device includes: (a) a frame; (b) a pair of opposed jaws moveably attached at one end to the frame; and (c) actuating means attached between the frame and the pair of opposed jaws, the actuating means adapted for moving the pair of opposed jaws between a first position wherein the pair of opposed jaws are in an unobstructed open position to allow a piece of cloth to freely pass into a position between the pair of opposed jaws and a second position wherein the pair of opposed jaws are in an operative clamping position with respect to each other to clamp a piece of cloth therebetween. Each of the pair of opposed jaws include a fabric contact surface having an array of fabric engaging teeth.

Another aspect of the present invention is to provide a pickup jaw for a pickup device of the type having a frame and a pair of opposed jaws moveably attached at one end to the frame for use with a fabric piece handling system. The head portion of at least one of the jaws includes: (a) a fabric contact surface having an array of fabric engaging teeth for urging a portion of the fabric piece into a bunched condition for pickup; and (b) a gripping surface adjacent to the fabric contact surface for engagement with the other of the opposed jaw for picking up the fabric piece.

Still another aspect of the present invention is to provide a pickup device for use with a fabric piece handling system. The device includes: (a) a frame; (b) a pair of opposed jaws moveably attached at one end to the frame; (c) actuating means attached between the frame and the pair of opposed jaws, the actuating means adapted for moving the pair of opposed jaws between a first position wherein the pair of opposed jaws are in an unobstructed open position to allow a piece of cloth to freely pass into a position between the pair of opposed jaws and a second position wherein the pair of opposed jaws are in an operative clamping position with respect to each other to clamp a piece of cloth therebetween; and (d) ejector means attached to the actuating means, wherein the ejector means and actuating means cooperate together to disengage a piece of cloth therebetween the pair of jaws when the pair of opposed jaws are in the first position wherein the pair of opposed jaws are in an unobstructed open position.

These and other aspects of the present invention will become apparent to those skilled in the art after a reading of the following description of the preferred embodiment when considered with the drawings.

BRIEF DESCRIPTION OF THE DRAWINGS

FIG. 1 is a front elevational view of a fabric pickup device, constructed in accordance with the present invention, in its open position;

FIG. 2 is an identical front elevational view of the pickup device shown in FIG. 1 but in its closed position;

FIG. 3 is an exploded perspective view of the pickup device shown in FIGS. 1 and 2;

DESCRIPTION OF THE PREFERRED EMBODIMENTS

Figure 6:
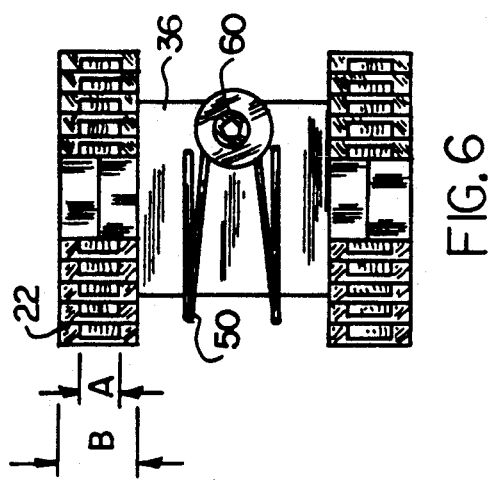
FIG. 6 is an enlarged bottom view of one pair of jaws of the pickup device shown in FIG. 5, taken along line 6—6, further illustrating the geometry of the fabric engaging teeth.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and to FIG. 1 in particular, it will understood that the illustrations are for the purpose of describing a preferred embodiment invention and are not intended to limit the invention thereto. As best seen in FIG. 1, a fabric pickup device, generally designated 10, is shown in its open position. In the preferred embodiment, fabric pickup device 10 includes a frame 12 for attachment to a machine frame 14 of a sewing machine or the like. A pair of opposed jaws 16 are moveably attached to one end of the frame by pivot points 20. The other end of each pair of opposed jaws 16 includes a fabric contact surface having an array of fabric engaging teeth 22. A fabric workpiece 24 is positioned adjacent to fabric engaging teeth 22 by the movement of either work surface 26, such as a feeding magazine, or machine frame 14.

In the preferred embodiment, fabric pickup device 10 includes a double acting pneumatic cylinder 30 having first and second inputs 32,34 connected to a selectively actuated air supply (not shown). Any other number of conventional pneumatic cylinders could be adapted to the present invention; however, one such cylinder which is particularly suitable is a Bimba Model 021-DXDE available from Sloane Fluid, 10033 Elm Hill Pike, Nashville, Tenn. One end of pneumatic cylinder 30 is connected to a cube-shaped slide 36. A guide pin 40 is fitted into an aperture 41 in slide 36 for engaging elongated apertures 42 in jaws 16. A plurality of removable spacers 46 are attached to the other free end of the pneumatic cylinder 30 and held in place by retainer 48. In a preferred embodiment, an ejector wire 50 is attached to the surface of the slide 36 opposite pneumatic cylinder 30 and positioned so as to extend below the surface of the fabric engaging teeth 22 when jaws 16 are in their open position. Preferably ejector wire 50 is formed from a resilient material such as a tempered wire formed into a C-shape. This arrangement insures that the fabric workpiece 24 is always disengaged from fabric engaging teeth 22 when jaws 16 are in the open position.

As best seen in FIG. 2, when pneumatic cylinder 30 receives a "close" signal through input 34, slide 36 is retracted towards frame 12. As a result, pin 40 moves within apertures 42 causing jaws 16 to come together. At the same time, the array of fabric engaging teeth 22 urge a portion of the fabric workpiece 24 into a bunched condition for pickup. A gripping surface 51 adjacent to the fabric engaging teeth 22 engages with the other opposed jaws 16 for picking up the fabric workpiece 24.

The construction of fabric pickup device 10 can best be understood by referring to FIG. 3 which shows an exploded perspective view of device 10. As can be seen, frame 12 includes a plurality of apertures 52 for receiving fasteners for attaching the frame 12 to machine frame 14. Preferably, frame 12 also includes a threaded aperture 54 for receiving one end of pneumatic cylinder 30. Similarly, slide 36 also includes a threaded aperture 56 for receiving the free end 57 of pneumatic cylinder 30. A fastener 60 and washer 62 may be used to attach ejector wire 50 to the side of the slide 36 opposite pneumatic cylinder 30. Retaining clips 64 are used to retain guide pin 40 in elongated apertures 42.

Figure 5:
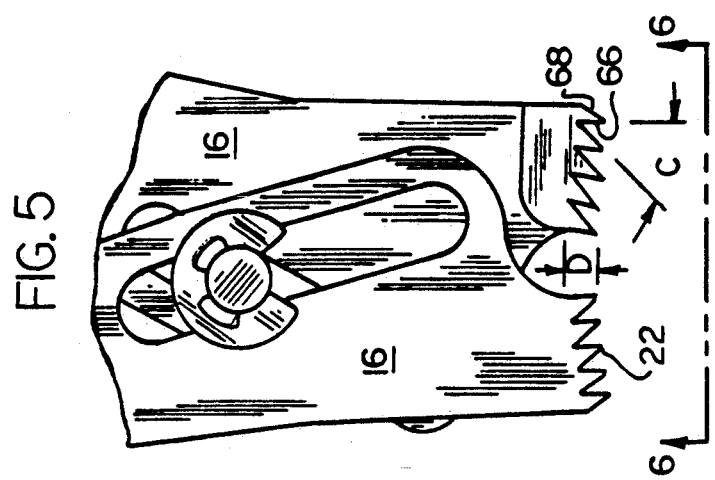
FIG. 5 is an enlarged fragmentary vertical section through the pickup device shown in FIG. 4, taken along line 5—5, illustrating the geometry of the fabric engaging teeth.
Figure 4:
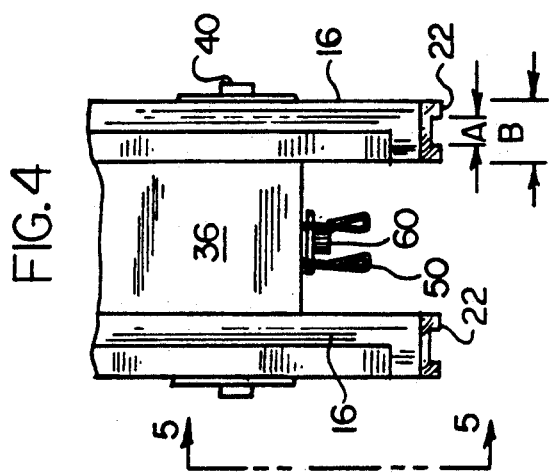
FIG. 4 is an enlarged fragmentary vertical section through the pickup device shown in FIG. 2, taken along line 4—4, illustrating the spacing between the fabric engaging teeth.

As best seen in FIGS. 4, 5 and 6, the head portion of at least one of the pairs of jaws 16 includes a fabric contact surface having an array of fabric engaging teeth 22 for urging a portion of the fabric piece 24 into a bunched condition for pickup. In the preferred embodiment, the array of fabric engaging teeth 22 are arranged into at least two spaced apart rows oriented parallel to the direction of movement of the jaws. Preferably, the ratio of dimension "A" to dimension "B" is approximately 50%. As best seen in FIG. 5, the array of fabric engaging teeth 22 are preferably sawtooth shaped. Accordingly, the leading edge 66 of each tooth is approximately perpendicular to the work surface 26 and the receding edge 68 is at angle "C" of approximately 45 degrees. In the preferred embodiment, the height of each tooth dimension "D" is approximately 1/16th".

Figure 7:
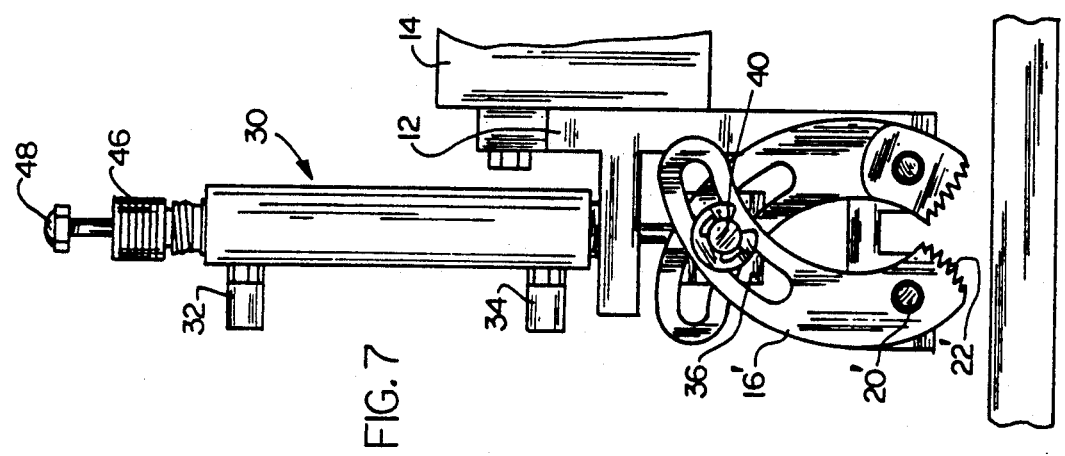
FIG. 7 is a front elevational view of an alternative embodiment of the fabric pickup device, constructed in accordance with the present invention, in its open position.

Finally, turning to FIG. 7, there is shown a front elevation view of an alternative embodiment of the fabric pickup device 10. This embodiment differs from the preferred embodiment in that jaws 16' are pivotally mounted adjacent to the head portion. In addition, elongated apertures 42 are arcuate-shaped thereby causing the heads to "roll" towards one another when pneumatic cylinder 30 is actuated. While this embodiment is suitable for many applications, it is not as reliable for lower weight, more pliable fabric workpieces 24. In addition, because of the modified arrangement of the pivot points 20, a more complex arrangement than ejector wire 50 must be used to dislodge the workpiece 24 from the fabric engaging teeth 22'.

In operation, either the fabric pickup device 10 is moved by means of machine frame 14 or fabric workpiece 24 is moved by means of work surface 26 until the fabric contact surface of jaws 16 engages the surface of the fabric workpiece 24. Next, pneumatic cylinder 30 is actuated and slide 36 is retracted causing jaws 16 to come together and urge a portion of the fabric workpiece into a bunched condition for pickup. The gripping surfaces 51 adjacent to the fabric contact surface engage with the other of the opposed jaws 16 for picking up the fabric workpiece 24. At this point, either machine frame 14 or work surface 26 retracts. Fabric pickup device 10 is then repositioned and pneumatic cylinder 30 is reversed causing slide 36 to move downward, releasing jaws 16 and causing ejector wire 50 to push the fabric workpiece 24 away from the plurality of fabric engaging teeth 22. This operation is then continuously repeated.

Since the head portion of jaws 16 having the plurality of fabric engaging teeth 22 is mounted rigidly to frame 12, the array of fabric engaging teeth 22 do not move vertically with respect to the fabric workpieces 24 during operation, thereby reducing the degree of control necessary for ply separation of small fabric pieces.

Certain modifications and improvements will occur to those skilled in the art upon reading of the foregoing description. By way of example, the jaws could be moved by means of a slide rather than pivoted about one end. In addition, while a pneumatic cylinder is the preferred embodiment, other linear actuators may be adapted to perform the same function. It should be understood that all such modifications and improvements have been deleted herein for the sake of conciseness and readability but are properly within the scope of the following claims.

I claim:

1. A pickup device for use with a fabric piece handling system, said device comprising:
   (a) a frame;
   (b) a first pair of opposed jaws moveably attached at one end to said frame; and
   (c) actuating means attached between said frame and said pair of opposed jaws, said actuating means adapted for moving said pair of opposed jaws between a first position wherein said pair of opposed jaws are in an unobstructed open position to allow a piece of cloth to freely pass into a position between said pair of opposed jaws and a second position wherein said pair of opposed jaws are in an operative clamping position with respect to each other to clamp a piece of cloth therebetween;
   wherein each of said pair of opposed jaws include a fabric contact surface arranged parallel to the surface of the piece of cloth having an array of nonpenetrating fabric engaging teeth.

2. The device according to claim 1, further including a second pair of opposed jaws attached to said frame and said actuating means parallel to and spaced apart from said first pair of opposed jaws.

3. The device according to claim 1, further including ejector means attached to said actuating means, wherein said ejector means and actuating means cooperate together to disengage a piece of cloth therebetween said pair of jaws when said pair of opposed jaws are in said first position wherein said pair of opposed jaws are in an unobstructed open position.

4. The device according to claim 3, wherein said ejector means is attached to said actuating means adjacent to said pair of opposed jaws.

5. The device according to claim 4, wherein said ejector means is formed from a resilient material and extends past said pair of opposed jaws in an unobstructed open position.

6. The device according to claim 5, wherein said ejector means is tempered wire formed into a "C"-shape.

7. The device according to claim 1, wherein said actuating means includes a fluid operated cylinder, having first and second free ends, attached to said frame and having said first free end of said cylinder attached to said pair of opposed jaws.

8. The device according to claim 7, wherein said second free end of said cylinder includes adjustable stop means for limiting the forward movement of said fluid operated cylinder attached to said frame and having said first free end of said cylinder attached to said pair of opposed jaws, thereby controlling the space therebetween said pair of jaws when said pair of opposed jaws are in said first position wherein said pair of opposed jaws are in an unobstructed open position.

9. The device according to claim 1, wherein said adjustable stop means includes a plurality of removable spacers attached to said second free end of said fluid operated cylinder.

10. A pickup jaw for a pickup device of the type having a frame and a pair of opposed jaws, having first and second ends, moveably attached at said first end to said frame for use with a fabric piece handling system, said second end of at least one of said jaws comprising:
    (a) a fabric contact surface arranged parallel to the surface of the fabric piece having an array of nonpenetrating fabric engaging teeth for urging a portion of said fabric piece into a bunched condition for pickup; and
    (b) a gripping surface adjacent to said fabric contact surface for engagement with the other of said opposed jaws for picking up said fabric piece.

11. The jaw according to claim 10, wherein said teeth are "saw-tooth"-shaped.

12. The jaw according to claim 10, wherein said array of fabric engaging teeth are arranged into at least two spaced apart rows oriented parallel to the movement of said jaw.

13. A pickup device for use with a fabric piece handling system, said device comprising:
    (a) a frame;
    (b) a first pair of opposed jaws, having first and second ends, moveably attached at said first end to said frame, wherein said second end of at least one of said jaws includes: a fabric contact surface arranged parallel to the surface of the fabric piece having an array of nonpenetrating fabric engaging teeth for urging a portion of said fabric piece into a bunched condition for pickup; and a gripping surface adjacent to said fabric contact surface for engagement with the other of said opposed jaws for picking up said fabric piece;
    (c) actuating means attached between said frame and said pair of opposed jaws, said actuating means adapted for moving said pair of opposed jaws between a first position wherein said pair of opposed jaws are in an unobstructed open position to allow a piece of cloth to freely pass into a position between said pair of opposed jaws and a second position wherein said pair of opposed jaws are in an operative clamping position with respect to each other to clamp a piece of cloth therebetween; and
    (d) ejector means attached to said actuating means, wherein said ejector means and actuating means cooperate together to disengage a piece of cloth therebetween said pair of jaws when said pair of opposed jaws are in said first position wherein said pair of opposed jaws are in an unobstructed open position.

14. The device according to claim 13, further including a second pair of opposed jaws attached to said frame and said actuating means parallel to and spaced apart from said first pair of opposed jaws.

15. The device according to claim 13, wherein said ejector means is attached to said actuating means adjacent to said pair of opposed jaws.

16. The device according to claim 13, wherein said ejector means is formed from a resilient material and extends past said pair of opposed jaws in an unobstructed open position.

17. The device according to claim 16, wherein said ejector means is tempered wire formed into a "C"-shape.

18. The device according to claim 13, wherein said actuating means includes a fluid operated cylinder, having first and second free ends, attached to said frame and having said first free end of said cylinder attached to said pair of opposed jaws.

19. The device according to claim 18, wherein said second free end of said cylinder includes adjustable stop means for limiting the forward movement of said fluid operated cylinder attached to said frame and having said first free end of said cylinder attached to said pair of opposed jaws, thereby controlling the space therebetween said pair of jaws when said pair of opposed jaws are in said first position wherein said pair of opposed jaws are in an unobstructed open position.

20. The device according to claim 19, wherein said adjustable stop means includes a plurality of removable spacers attached to said other free end of said fluid operated cylinder.

21. The device according to claim 13, wherein said teeth are "saw-tooth"-shaped.

22. The device according to claim 13, wherein said array of fabric engaging teeth are arranged into at least two spaced apart rows oriented parallel to the movement of said jaw.

* * * * *